(12) United States Patent
Glen et al.

(10) Patent No.: US 7,010,463 B1
(45) Date of Patent: Mar. 7, 2006

(54) METHOD OF DETERMINING WHETHER AN IMPROVED ITEM HAS A BETTER MEAN LIFETIME THAN AN EXISTING ITEM

(75) Inventors: Andrew G. Glen, West Point, NY (US); Bobbie L. Foote, Cornwall-on-Hudson, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 74 days.

(21) Appl. No.: 10/771,202

(22) Filed: Feb. 4, 2004

Related U.S. Application Data

(60) Provisional application No. 60/510,517, filed on Oct. 14, 2003.

(51) Int. Cl.
G06F 11/30 (2006.01)
G06F 9/45 (2006.01)

(52) U.S. Cl. ........................................ 702/185; 703/22
(58) Field of Classification Search ................ 702/185, 702/182, 183; 703/22
See application file for complete search history.

(56) References Cited

U.S. PATENT DOCUMENTS

| | | | | |
|---|---|---|---|---|
| 5,808,908 | A * | 9/1998 | Ghahramani | ................ 702/182 |
| 5,893,069 | A | 4/1999 | White, Jr. | |
| 6,633,177 | B1 * | 10/2003 | Okada | ........................ 324/765 |
| 6,684,349 | B1 * | 1/2004 | Gullo et al. | ................... 714/47 |
| 6,724,214 | B1 * | 4/2004 | Manna et al. | ................ 324/766 |
| 6,795,793 | B1 * | 9/2004 | Shayegan et al. | ........... 702/179 |

OTHER PUBLICATIONS

Bugaighis, M., Exchange of Censorship Types and its Impact on the Estimation of Parameters of a Weibull Regression Model, Sep. 1995, IEEE Transactions on Reliability, vol. 44, No. 3, pp. 496-499.*
Tang et al., Analysis of Step-Stress Accelerated-Life-Test Data: A New Approach, Mar. 1996, IEEE Transactions on Reliability, vol. 45, No. 1, pp. 69-74.*
Gera, A., The Modified Exponential-Weibull Distribution for Life-Time Modeling, 1997, Proceedings Annual Reliability and Maintainability Symposium, pp. 149-152.*
Fatatsuya, M., Prediction Intervals for System Lifetime, Based on Compoent Test Data, Dec. 4, 2000, IEEE Transactions on Reliability, vol. 49, No. 4, pp. 351-354.*
Chandramouli et al., Sequential Tests for Integrated-Circuit Failures, Dec. 1998, IEEE Transaction on Reliability, vol. 47, No. 4, pp. 463-471.*
Glen et al., APPL: A Probability Programming Language, May 2001, The American Statistician, vol. 55, No. 2, pp. 156-166.*

* cited by examiner

*Primary Examiner*—Bryan Bui
*Assistant Examiner*—Toan M. Le
(74) *Attorney, Agent, or Firm*—Alan P. Klein

(57) ABSTRACT

A method of determining whether an improved item has a better mean lifetime than an existing item having a fully specified lifetime distribution function. A finite number n of examples of the new item are placed on life test, and the failure times of the n examples of the new item are recorded as they occur. At each occurrence of failure, the newly noted failure time is entered into a list of previously noted failure times and the most up-to-date statistical P-value is calculated for the life test so far. When the statistical P-value is sufficiently small there is statistical inference that the new item is better than the current one, and the test is ended.

1 Claim, 1 Drawing Sheet

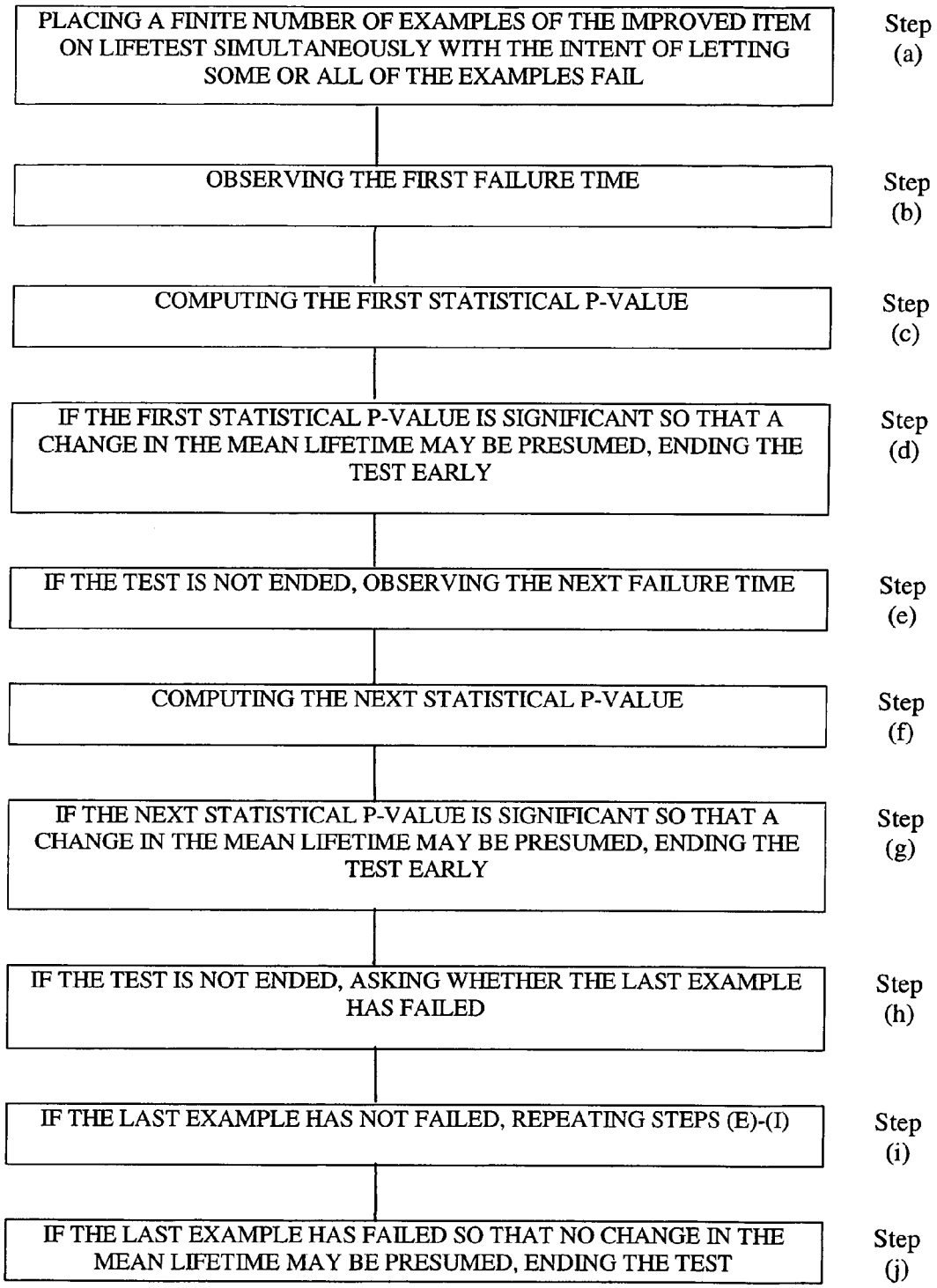

METHOD OF DETERMINING WHETHER AN IMPROVED ITEM HAS A BETTER MEAN LIFETIME THAN AN EXISTING ITEM

CROSS-REFERENCE TO RELATED APPLICATIONS

This application claims priority from U.S. Provisional Patent Application Ser. No. 60/510,517 filed Oct. 14, 2003.

BACKGROUND OF THE INVENTION

This invention relates in general to life testing applications, and more particularly to tests designed to gain an understanding of the probabilistic properties of a component or a system of components.

Consider an existing component, process, or a pharmaceutical drug with a fully specified lifetime distribution function $F(x)$. Should an improved component, process, or pharmaceutical drug come along, both producers and consumers would like to verify that the new item compares favorably to the existing item, most often by determining if its mean lifetime has decreased or increased.

In the life testing of the new component, it would be highly desirable, in terms of money and time, to stop the test when enough evidence exists to support a claim that the mean lifetime has either decreased or increased. Such censoring, commonly called Type I (stop after time t) or Type II (stop after r items fail), can produce statistical inference. However, existing methods are not widely known, nor do they have remarkable statistical power.

SUMMARY OF THE INVENTION

It is therefore an object of this invention to provide a method relying on Type II censoring that gives statistical inference on censored samples.

This and other objects of the invention are achieved by a method of determining whether an improved item has a better mean lifetime than an existing item having a fully specified lifetime distribution function. A finite number n of examples of the new item are placed on life test, and the failure times of the n examples of the new item are recorded as they occur. At each occurrence of failure, the newly noted failure time is entered into a list of previously noted failure times and the most up-to-date statistical P-value is calculated for the life test so far. When the statistical P-value is sufficiently small there is a statistical inference that the new item is better than the current one, and the test is ended.

The method reduces cost and time on test while preserving reasonable levels of statistical power.

Additional advantages and features will become more apparent as the subject invention becomes better understood by reference to the following detailed description when considered in conjunction with the accompanying drawings wherein:

BRIEF DESCRIPTION OF THE DRAWINGS

The sole FIGURE is a flow chart of the method in accordance with the present invention.

DETAILED DESCRIPTION

Referring to the FIGURE, the method of determining whether an improved item has a better mean lifetime than an existing item with a fully specified lifetime distribution function $F(x)$ is illustrated as comprising ten steps, which will hereinafter be designated steps (a) through (j).

In the first step, step (a), a finite number n of examples of the improved item are placed on life test simultaneously with the intent of letting some or all of the n examples fail.

In the second step, step (b), the first failure time is observed.

In the third step, step (c), the first statistical P-value is computed. The statistical P-value is defined as the probability of observing the failure time that is observed, if the null hypothesis—that the new item is no better than the old item—were true. In other words, the statistical P-value is the "believability" of the null hypothesis. The consequence of this definition is that if the P-value is low (typically a probability below 0.05) the null hypothesis may be rejected and the alternative hypothesis—that the new item is better—may be accepted. When the statistical P-value is sufficiently small (often times smaller than 0.01) there is exact statistical inference that the new item is better than the current one.

While the P-value may be computed in a variety of ways, conveniently the P-value may be computed in the manner illustrated in the example below by using a PC jointly running MAPLE, APPL, and the "CensoredT" code presented in the appendix of this patent.

MAPLE is a mathematical software package used principally for symbolic computation in algebra and calculus that is commercially available from Maplesoft, 615 Kumpf Drive, Waterloo, Ontario, Canada N2V 1K8. Versions are available for Windows and Linux. It is used through a worksheet interface. At the prompt, the user enters "commands" to tell MAPLE what to do. The most basic commands are numerical and involve basic mathematical operations, such as addition, subtraction, multiplication, division, exponentiation, and factorial. To evaluate a command, the user ends with a semicolon.

APPL is a probabilistic software package that introduces into MAPLE an extra set of commands to serve as a supplement for statistical analysis. It may be downloaded at www.dean.usma.edu/math/people/glen/APPL%20Code.htm.

The "CensoredT" code is a compilation of MAPLE and APPL commands that comprise the necessary steps to calculate the very detailed conditional order statistic probabilities that make up the P-value.

In the fourth step, step (d), if the first statistical P-value is significant—preferably, less than 0.05—so that a change in the mean lifetime may be presumed, the test is ended early.

In the fifth step, step (e), if the test is not ended, the next failure time is observed.

In the sixth step, step (f), the next statistical P-value for these subsequent new data values is computed.

In the seventh step, step (g), if the next statistical P-value is significant—preferably, less than 0.05—so that a change in the mean lifetime may be presumed, the test is ended early.

In the eighth step, step (h), if the test is not ended, it is asked whether the last example has failed.

In the ninth step, step (i), if the last example has not failed, steps (e)–(i) are repeated.

In the tenth step, step (j), if the last example has failed so that no change in the mean lifetime may be presumed, the test is ended.

For a clearer understanding of the invention, a specific example is set forth below. This example is merely illustrative and is not to be understood as limiting the scope and underlying principles of the invention in any way.

EXAMPLE

A current light bulb has a well defined mean life of 1000 hours and is adequately described by the exponential random variable with parameter $1/1000$. An experimenter wants to show that a new light bulb has higher mean life. The experimenter places n=35 new versions of light bulb on life test and notes the following failure times. The first bulb fails at time 49 hours, the second at time 72 hours, the third at time 115 hours, and the fourth at time 197 hours. Using a PC jointly running MAPLE, APPL and "CensoredT," after the first bulb failure, the experimenter enters the failure time into a list of failure times and executes the CensoredT command to determine that the statistical P-value for only one failure is 0.255. After the second failure, the experimenter enters the new failure time into the list of previously noted failure times and re-executes the CensoredT command to determine that the statistical P-value for both of the two items is 0.203. After the third failure, the experimenter enters the new failure time into the list of previously noted failure times and re-executes the CensoredT command to determine that the statistical P-value for all three items to fail is 0.113. After the fourth failure, the experimenter enters the new failure time into the list of previously noted failure times and re-executes the CensoredT command to determine that the statistical P-value for all four items is 0.034. At this point he has significant evidence (at least at the 0.05 level of significance) to conclude that the new light bulbs have a longer mean life. He can thus stop the test at time 197 hours, as opposed to waiting for the total experiment to end, which would be at about 4146 hours, if the new light bulb is no better than the old (longer if the new ones are better).

In a MAPLE session work sheet, the steps to this example are as follows:
>restart;
>read(`d:/APPL/appl.txt`); read(`d:\CensoredT.txt`);
>X:=ExponentialRV(1/1000.);
    X:=[[x→0.001000000000e$^{(-0.001000000000x)}$], [0, ∞], ["Continuous", "PDF"]]
>data:=[49];
    data :=[49]
>CensoredT(X,data, 35);
    0.7446193253, 0.7446193253, 0.2553806747
>data:=[49, 72];CensoredT(X, data, 35);
    data:=[49, 72]
    1.362546169, 0.7968263065, 0.2031736935
>data:=[49, 72, 115];CensoredT(X, data, 35);
    data:=[49, 72, 115]
    2.120590359, 0.886649768, 0.113350232
>data:=[49, 72, 115, 197];CensoredT(X, data, 35);
    data:=[49, 72, 115, 197]
    3.048079409, 0.965786950, 0.034213050

The first command starts the program MAPLE. The second command reads APPL and "CensoredT" into the MAPLE program. The third command enters the lifetime distribution function into MAPLE. The fourth command enters the first failure time into a data list. The fifth command computes the first P-value. It calls the program whose listing is attached hereto as an appendix. Referring to the appendix, lines 1–10 set up the initial conditions. Lines 12–19 calculate the test statistic (called "stat"). Line 28 calculates the distribution of the 'stat.' Finally, line 31 computes and prints in order, the 'stat', the upper P-value (for determining if the mean lifetime has increased), and the lower P-value (for determining if the mean lifetime has decreased).

The sixth command enters the second failure time into the data list, and computes the second P-value. The seventh command enters the third failure time into the data list, and computes the third P-value. The eighth command enters the fourth failure time into the data list and computes the fourth P-value.

It is obvious that many modifications and variations of the present invention are possible in light of the above teachings. It is therefore to be understood that within the scope of the appended claims, the invention may be practiced otherwise than as described.

APPENDIX

1. # CensoredT is a procedure that returns test statistic of the
2. # T_r and the upper and lower P-values for that statistic
3. #
4. # Set up the problem
5. CensoredT:=proc(Nulldist, faildata, size)
6. local i, n, r, sample, stat, Zlist;
7. global Tdist;
8. n :=size;
9. sample :=sort(faildata);
10. r :=nops(sample);
11.
12. # transform the sample thru the PIT of Nulldist
13. Zlist :=[ ];
14. for i from 1 to r do
15. Zlist :=[op(Zlist), CDF(Nulldist, sample[i])];
16. od;
17.
18. #Find the tstat and Pvalue for first point
19. stat:=CDF(OrderStat(UniformRV(0,1), n, 1), Zlist[1]);
20.
21. #Find the tstat and Pvalue for all subsequent points
22. if (r>1) then
23. for i from 2 to r do
24. stat :=stat +CDF(OrderStat(Truncate(UniformRV(0, 1),
25. evalf(Zlist[i−1]), 1), n−(i−1), 1), Zlist[i]);
26. od;
27. fi;
28. Tdist :=ConvolutionIID(UniformRV(0, 1), r);
29.
30. # Calculate and return pvalue using the CDF function
31. RETURN(stat, CDF(Tdist, stat), 1-CDF(Tdist, stat));
32. end:

What is claimed as new and desired to be secured by Letters Patent of the United States is:

1. A method of determining whether an improved item has a better mean lifetime than an existing item with a fully specified lifetime distribution function, comprising the steps of:
   (a) placing a finite number n examples of the improved item on life test simultaneously with the intent of letting some or all of the n examples fail;
   (b) observing the first failure time;
   (c) computing the first statistical P-value;
   (d) if the first statistical P-value is less than 0.05, ending the test early;
   (e) if the test is not ended, observing the next failure time;
   (f) computing the next statistical P-value;
   (g) if the next statistical P-value is less than 0.05, ending the test early;
   (h) if the test is not ended, asking whether the last example has failed;
   (i) if the last example has not failed, repeating steps (e)–(i); and
   (j) if the last example has failed, ending the test.

* * * * *